US006868391B1

(12) United States Patent
Hultgren

(10) Patent No.: US 6,868,391 B1
(45) Date of Patent: Mar. 15, 2005

(54) TELE/DATACOMMUNICATIONS PAYMENT METHOD AND APPARATUS

(75) Inventor: Anders Hultgren, Danderyd (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1063 days.

(21) Appl. No.: 09/047,533

(22) Filed: Mar. 25, 1998

Related U.S. Application Data

(60) Provisional application No. 60/049,774, filed on Jun. 16, 1997, and provisional application No. 60/043,610, filed on Apr. 15, 1997.

(51) Int. Cl.[7] .............................................. G06F 17/60
(52) U.S. Cl. ............................ 705/26; 705/27; 705/40; 705/39; 705/16; 705/80; 705/44; 455/408; 455/410; 455/456.1; 379/91.01; 379/145
(58) Field of Search ............................. 705/16, 17, 26, 705/39, 40, 44, 80; 455/3.2, 410, 415, 433, 435, 438, 456, 575; 379/91.01, 93.02, 118, 145, 245

(56) References Cited

U.S. PATENT DOCUMENTS

| | | | |
|---|---|---|---|
| 4,776,003 A | | 10/1988 | Harris |
| 4,965,821 A | | 10/1990 | Bishop et al. |
| 5,025,373 A | | 6/1991 | Keyser, Jr. et al. |
| 5,144,649 A | | 9/1992 | Zicker et al. |
| 5,208,446 A | | 5/1993 | Martinez |
| 5,221,838 A | | 6/1993 | Gutman et al. |
| 5,247,160 A | | 9/1993 | Zicker |
| 5,303,393 A | * | 4/1994 | Noreen et al. ............... 455/3.2 |
| 5,359,182 A | | 10/1994 | Schilling |
| 5,504,677 A | | 4/1996 | Pollin |
| 5,608,778 A | | 3/1997 | Partridge, III ............... 379/58 |
| 5,627,886 A | * | 5/1997 | Bowman ..................... 379/111 |
| 5,991,749 A | * | 11/1999 | Morrill, Jr. ................... 705/44 |
| 6,026,375 A | * | 2/2000 | Hall et al. .................... 705/26 |
| 6,032,044 A | * | 2/2000 | Shannon et al. ............. 455/433 |

FOREIGN PATENT DOCUMENTS

| | | | |
|---|---|---|---|
| CN | 1056214 A | 11/1991 | |
| CN | 1118482 A | 3/1996 | |
| EP | 0 501 697 A2 | 9/1992 | |
| EP | 0 590 861 A2 | 4/1994 | |
| EP | 0 708 547 A2 | 4/1996 | |
| EP | 0 732 835 A2 * | 5/1996 | ........... H04L/29/06 |
| WO | 94/11849 | 5/1994 | |
| WO | 95/22113 | 8/1995 | |
| WO | 96/13814 | 5/1996 | |
| WO | 96/14588 A1 | 5/1996 | |
| WO | 96/25828 | 8/1996 | |
| WO | 96/32700 | 10/1996 | |

OTHER PUBLICATIONS

Dialog reference, file 9 # 1751995 "Credit Union Central Joins Smart Card System" Globe & Mail, p B2, Feb. 7, 1997, Regional Newspaper.*
Struthers–Watson et al, "Need Money? Your Wish is My Command", Communications International, Jul., pp. 8–10, 12 and 14.
"Dial a Coke", *Reaching Out*, vol. 98/1, Jan. 1998.
Molony, "Now the Finns Can Dial In, Drive In, Wash, Wax'n'go", Communicationsweek International, Feb. 2, 1998.
"Out of the Labs", *Tele.com*, Jun. 1996, p. 18.

\* cited by examiner

*Primary Examiner*—Raquel Alvarez
(74) *Attorney, Agent, or Firm*—Nixon & Vanderhye, P.C.

(57) ABSTRACT

A tele/datacommunications network has a service node (TSN) (30) which facilitates payment/transfer from a customer account of a customer financial institution (80) to a merchant account of a merchant financial institution (90). The TSN (30) acquires a merchant identifier and transaction amount from a customer mobile station (60). The TSN (30) sends a transaction verification request message to both the customer mobile station (60) and the merchant terminal (70). Upon receipt of transaction verification, the TSN (30) requests transfer of the transaction amount from the customer account to the merchant account.

65 Claims, 13 Drawing Sheets

TELE/DATACOMMUNICATIONS PAYMENT METHOD AND APPARATUS

This application claims the benefit of the following, both of which are incorporated herein by reference: (1) U.S. Provisional Patent Application No. 60/043,610 which was filed on Apr. 15, 1997 by the same inventor bearing title TELE/DATACOMMUNICATIONS PAYMENT METHOD AND APPARATUS; (2) U.S. Provisional Patent Application No. 60/049,774 which was filed on Jun. 16, 1997 by the same inventor bearing title TELE/DATACOMMUNICATIONS PAYMENT METHOD AND APPARATUS.

BACKGROUND

1. Field of the Invention

This invention pertains to employment of telecommunications to facilitate financial transactions.

2. Related Art and Other Considerations

Many consumer-based commercial transactions involve payment using a credit card or bank debit card. In the course of such transactions, a computerized "cash register" terminal or the like is connected by a telecommunications link to a financial institution (e.g., a bank or credit card company which sponsors the card) for the purpose of obtaining an authorization or indication that the consumer's account balance is sufficient to cover the cost of the particular transaction. In the case of a bank debit card, the consumer's account is essentially immediately debited for the amount of the transaction, and the funds ultimately made available to the seller or provider of services. For a credit card, on the other hand, the consumer is subsequently mailed a bill requiring payment for the transaction.

For consumers utilizing written checks, similar services are available for obtaining at least preliminary approval that the check will clear the bank upon which the check is drawn.

The check, credit card, and debit card modes of payment require, of course, that the consumer physically posses the same at the time of the transaction. Checks, credit cards, and debit cards are of no value if left at home or otherwise unavailable at the time of the transaction.

Moreover, there are significant security risks involved with utilization of checks, credit cards, and debit cards. All are prone to being lost or stolen, and subsequently improperly used by third persons. A further risk is that imprints or copies of the cards may enable unauthorized use by a third person.

What is needed, therefore, and an object of the present invention, is a secure and efficient mode of payment for a financial transaction.

BRIEF SUMMARY OF THE INVENTION

A tele/datacommunications network has a service node (TSN) which facilitates payment/transfer from a customer account of a customer financial institution to a merchant account of a merchant financial institution. The TSN acquires a merchant identifier and transaction amount from a customer mobile station. The TSN sends a transaction verification request message to both the customer mobile station and the merchant terminal. Upon receipt of transaction verification, the TSN requests transfer of the transaction amount from the customer account to the merchant account.

The TSN of the invention also optionally provides an authorization assurance feature and a security feature. For authorization assurance, prior to requesting a funds transfer from the customer account in the amount of the transaction amount, the TSN checks whether the customer financial institution will authorize such funds transfer.

The transaction can occur in a variety of manners. In one mode of the invention, the transaction can occur while the customer is at the merchant's premises, whereat the customer acquires the merchant identifier and the transaction amount. In another mode, the customer can be at a customer predetermined native location, e.g., at the customer's home or place of business, where the customer views a merchant's web page. The merchant's web page, in addition to providing the merchant identifier, provides either an advertisement of an invoice (e.g., a utility bill).

For the first mode of the invention, the security feature of the invention enables the TSN to confirm that the customer wireless communication unit (e.g., mobile station) is within a predetermined geographical proximity of the merchant terminal prior to requesting transfer of the transaction amount from the customer account to the merchant account at the merchant financial institution. The TSN has access to prestored GPS location coordinates of the merchant terminal, and receives the current GPS coordinates of the customer mobile station from the customer mobile station. The TSN compares the GPS location coordinates of the merchant terminal and the current GPS coordinates of customer mobile station to determine if the two are within an acceptable proximity range.

For the second mode of the invention, the security feature of the invention enables the TSN to confirm that the customer is in a customer predetermined native location at the time the customer authorizes payment to the merchant. For example, the geographical security feature would bar any purchases or payment initiated when (1) the mobile station is not connected to base station(s) used when the owner of the mobile station is at one of his customer predetermined native locations, or (2) when GPS coordinates of the mobile station are not within an acceptable proximity range of the customer predetermined native location.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 2A(2) is a schematic view of the service control node included in the telecommunications network of FIG. 1A for a second mode of the invention.

FIG. 3 is a schematic view showing the relationship of FIG. 3A, FIG. 3B, and FIG. 3C.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
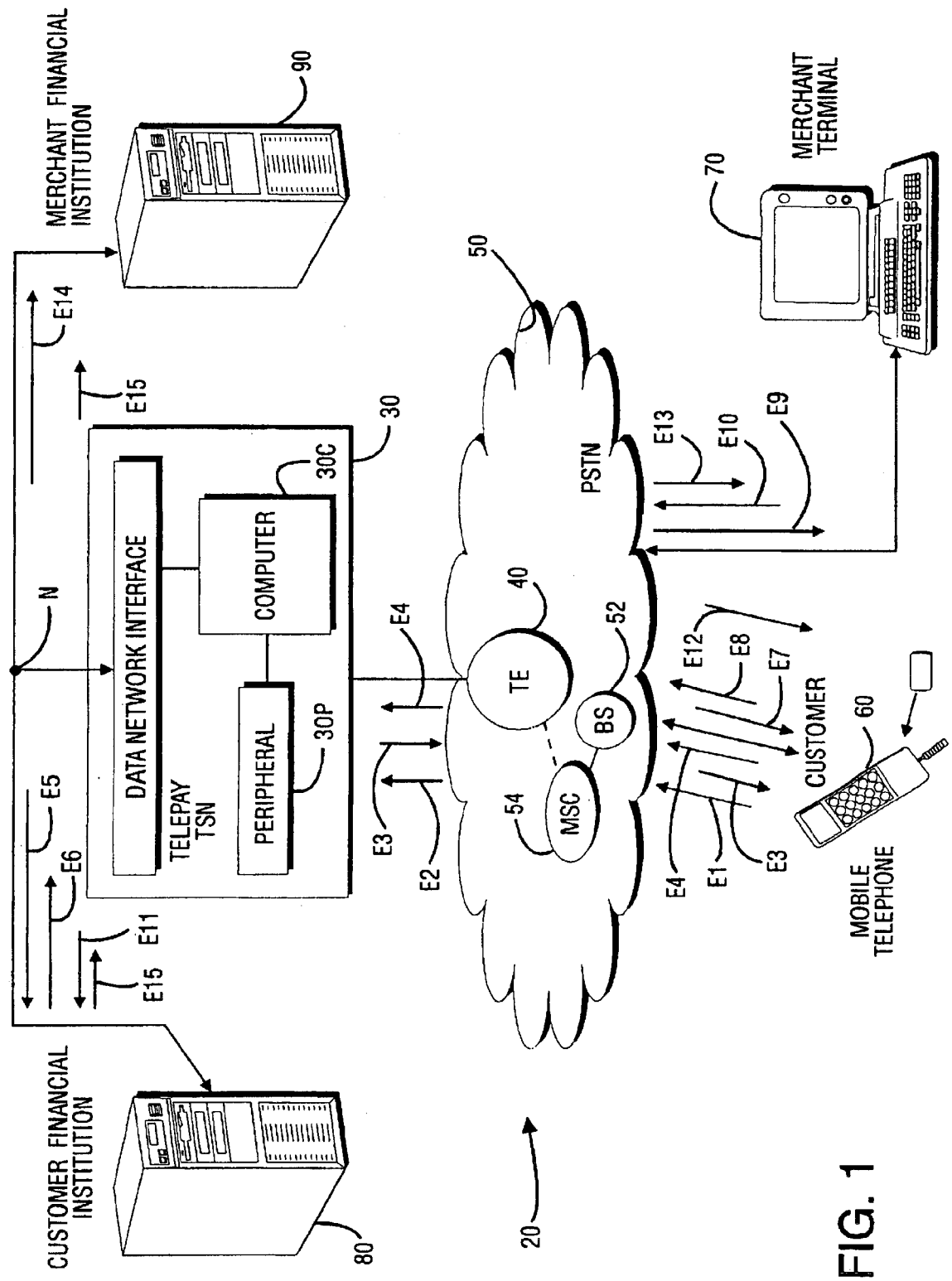
FIG. 1 is a schematic view of a tele/datacommunications network including a node which provides a telepayment service according to an embodiment of the invention.

FIG. 1 shows a telecommunications network 20 having a special function node known as a telepay service node (TSN) 30. Telepay TSN 30 is connected to an exchange, such as transit exchange (TE) 40, of a public switched telephone network (PSTN) 50. PSTN 50 includes both landline and radio communications links. As such, PSTN 50 provides connections to a plurality of remote wireless units or mobile stations, of which customer mobile station 60 (e.g., a mobile telephone) is but one example, and via landlines to non-mobile units such as merchant terminal 70. Although customer wireless communication unit 60 is hereinafter illustrated as being a mobile telephone, it should be understood that other types of devices are also contemplated for use with the invention, such as a personal digital assistant (PDA) with a radio connection to PSTN 50 or a computer with mobile termination capabilities.

Customer mobile terminal 60 is served by base station (BS) 52 in PSTN 50. Base station 52 is connected to a mobile switching center (MSC) 54 which routes calls from the customer to telepay TSN 30.

FIG. 1 shows telepay TSN 30 as also being connected by a data network N to a customer financial institution 80 and a merchant financial institution 90. Although illustrated separately, it should be understood that network N can be included in PSTN 50. Moreover, a variety of protocols (e.g. X.25, X.21, leased line and TCP/IP, or internet/TCP/IP) can be utilized over network N.

Figure 5A:
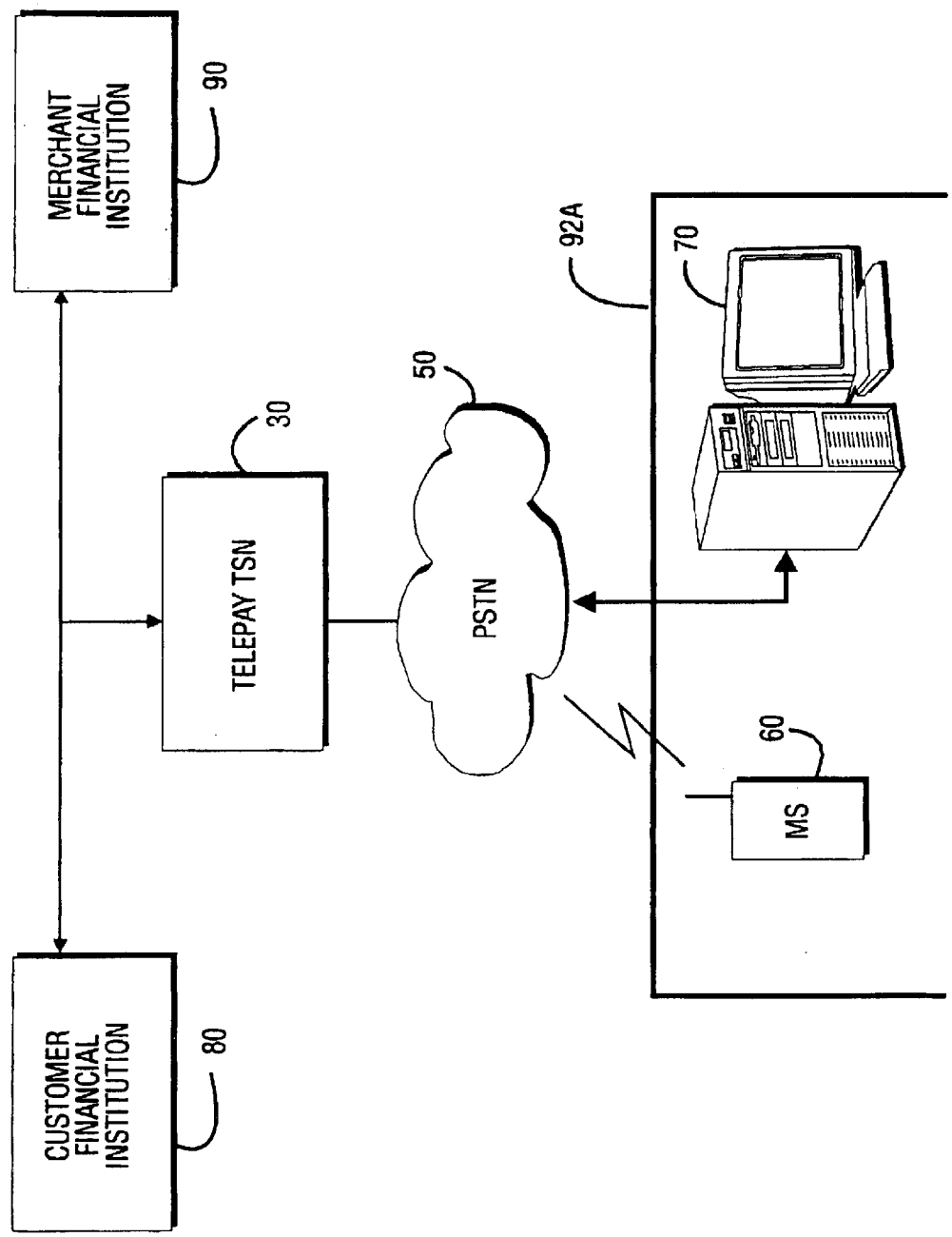
FIG. 5A is a schematic view of a portion of FIG. 1, but depicting a customer at a merchant's premises.
Figure 5B:
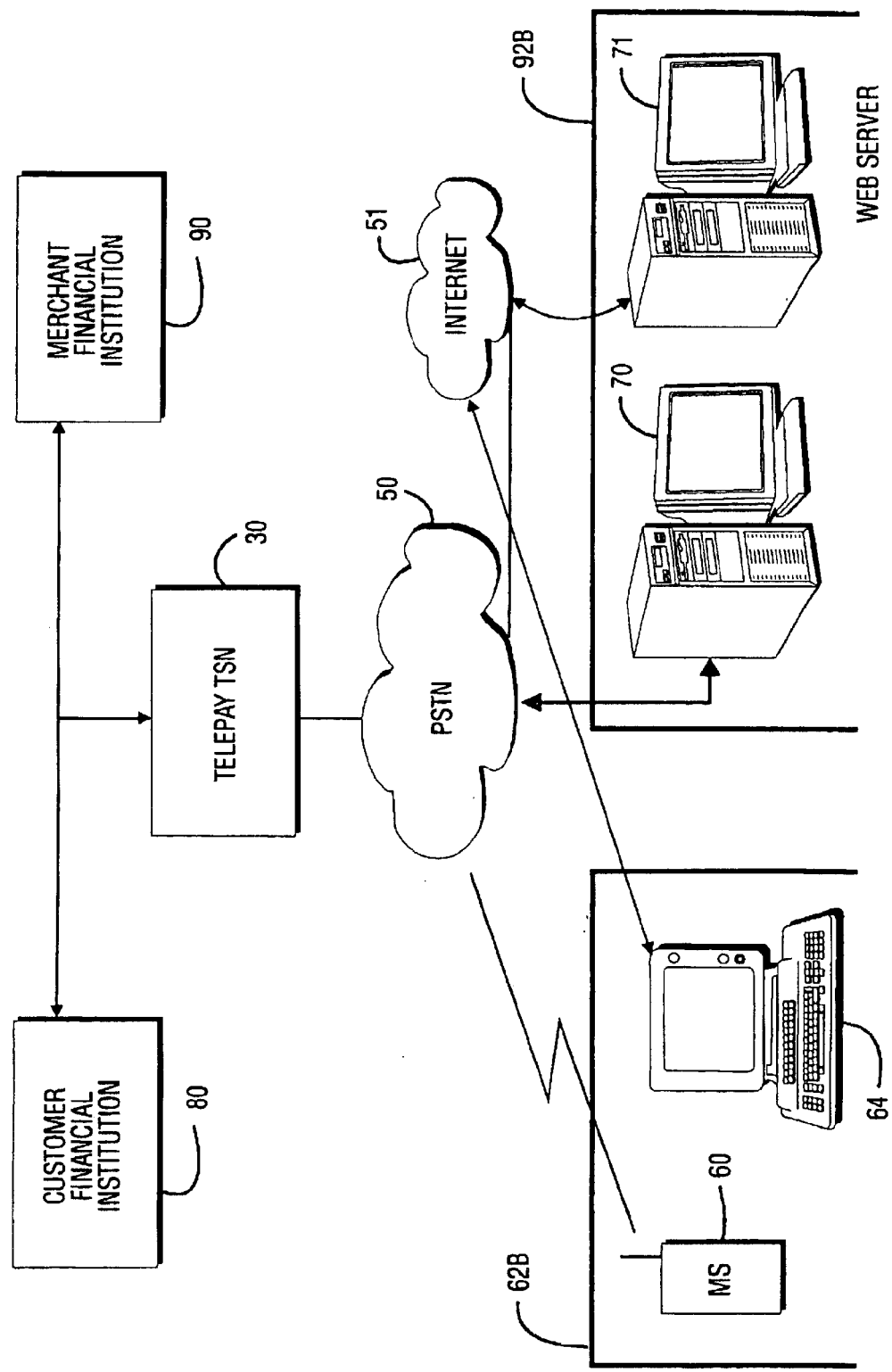
FIG. 5B is a schematic view of a portion of FIG. 1, but depicting a customer having a mobile station (in the form of a mobile telephone) and a workstation at a customer predetermined native location which is preferably remote from a merchant's premises.
Figure 5C:
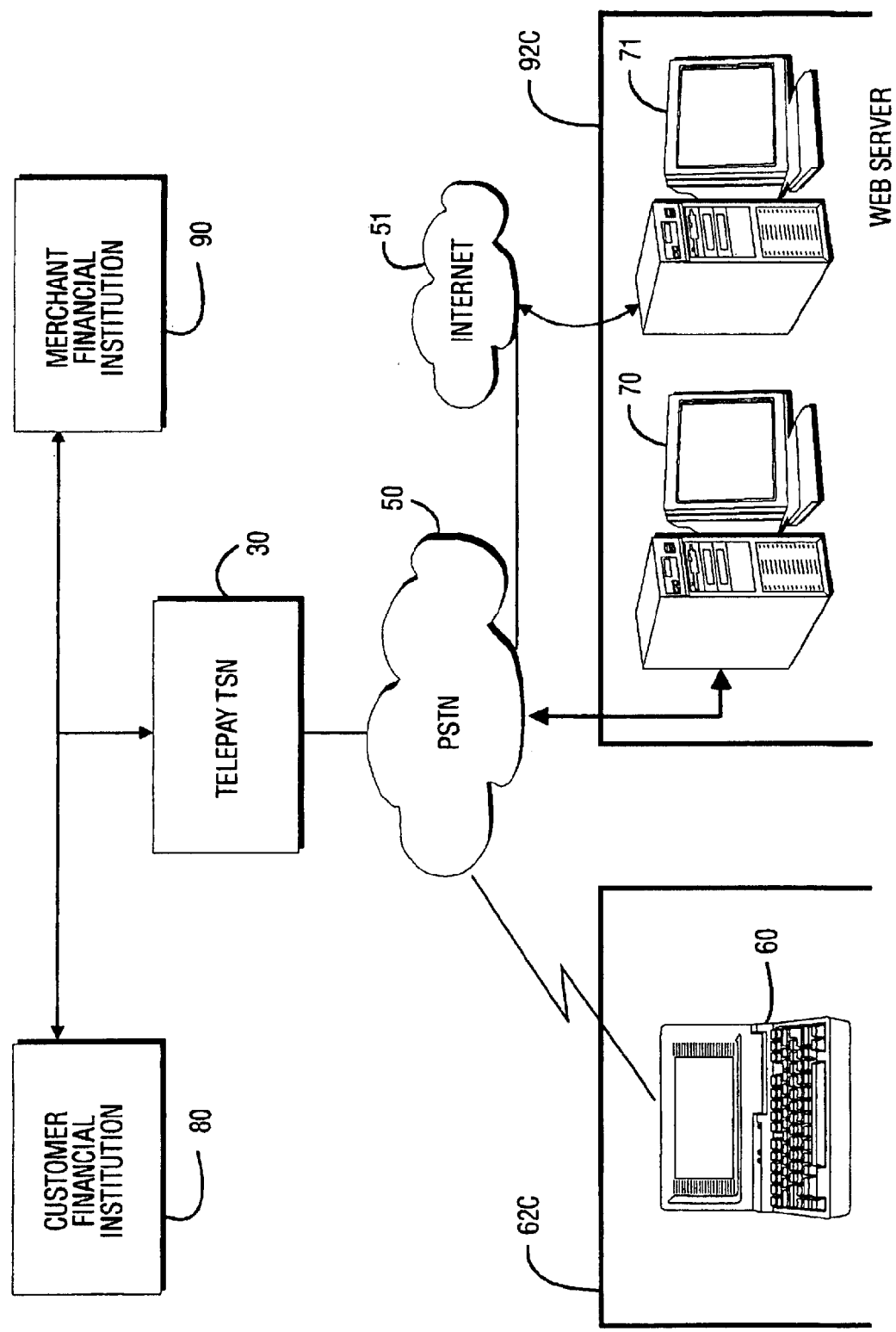
FIG. 5C is a schematic view of a portion of FIG. 1, but depicting a customer having a mobile station (in the form of a laptop computer with mobile termination capabilities), the mobile station situated at a customer predetermined native location which is preferably remote from a merchant's premises.

While FIG. 5B and FIG. 5C show PSTN 50 and internet 51 directly connected together, the person skilled in the art will appreciate that, such illustrations are a simplification for not obscuring salient aspects of the invention. In reality, both data switched networks (such as internet 51) and circuit switched networks are connected via respective service or gateway nodes to mobile switching centers of a mobile telecommunications network. The mobile telecommunications network comprises not only the mobile stations, but base stations in radio communications with the mobile stations, base station controllers (also known as radio network controllers) in communication with the base stations, and with the mobile switching centers communicating with the base stations controllers.

In accordance with the present invention, a customer who operates customer mobile station 60 seeks to purchase goods or services from a merchant. The merchant has merchant terminal 70 which functions as a computerized cash register and which has modem connection to PSTN 50. The customer via customer mobile station 60 can make payment for the goods or services using telepay TSN 30, and particularly can transfer funds from the customer's account in customer financial institution 80 to the merchant's account in merchant financial institution 90. Customer financial institution 80 can be, for example, a banking institution with which the customer has an account or a credit card company with which the customer has an account.

The present invention permits financial transactions to occur in a variety of manners. FIG. 5A depicts a first mode of the invention, in which the transaction occurs while the customer is at the merchant's premises 92A. At the merchant's premises 92A the customer acquires the merchant identifier and the transaction amount. FIG. 5B illustrates a second mode of the invention in which the customer is situated at a customer predetermined native location 62B, preferably remote from the merchant's premises 92B. The customer predetermined native location 62B can be, for example, the customer's home or place of business. In accordance with this second mode, at the customer predetermined native location 62B the customer views a merchant's web page as displayed on a monitor 64B. The merchant's web page, in addition to providing the merchant identifier, provides either an advertisement of an invoice (e.g., a utility bill). FIG. 5C illustrates a variation of the second mode of the invention in which mobile station 60 takes the form of a laptop computer with mobile termination. The mobile station of FIG. 5C is capable of having connections (through the mobile telecommunications network) both with the internet 51 and with PSTN 50.

In brief, suppose that the customer wants to pay $100US for a good or service, or for payment of a bill or invoice (such as a utility bill, for example). In accordance with the present invention, the customer merely dials the directory number of the telepay TSN 30 (e.g. a A1-800" directory number) and, in response to prompts generated by telepay TSN 30, enters a merchant identifier and a transaction amount ($100US). The merchant identifier is provided by the merchant (e.g., prominently displayed at the merchant's premises 92A [see FIG. 5A] or shown on the merchant's web page displayed on monitor 64B [see FIG. 5B] or laptop [see FIG. 5C]). The transaction amount is the total cost for the good or service or bill amount. Telepay TSN 30 sends a verification message to at least one, and preferably both, parties to the transaction. In this regard, telepay TSN 30 sends a verification message to the merchant, providing (e.g., on a cash register display) the transaction amount to be credited to the merchant's account and a transaction code. A similar verification message is sent to customer mobile station 60. If in agreement, both the customer and the merchant then send a verification message to telepay TSN 30. Telepay TSN 30 then arranges for the customer account to be debited, and the merchant account to be credited, by the transaction amount.

In the embodiment illustrated in FIG. 1, telepay TSN 30 is a special purpose node which includes general purpose computer 30C having a UNIX or Microsoft NT operating system and executes a set(s) of coded instructions for performing the actions herein described. Computer 30C is connected to an accessory or peripheral 30P and a data network interface 30D. Peripheral 30P receives and interprets DTMF signalling of numbers (e.g., for transaction amount, merchant identifier, PIN), and also generates and transmits voice/sound prompts. Data network interface 30D is connected via data network N to customer financial institution 80 and to merchant financial institution 90.

Figure 2:
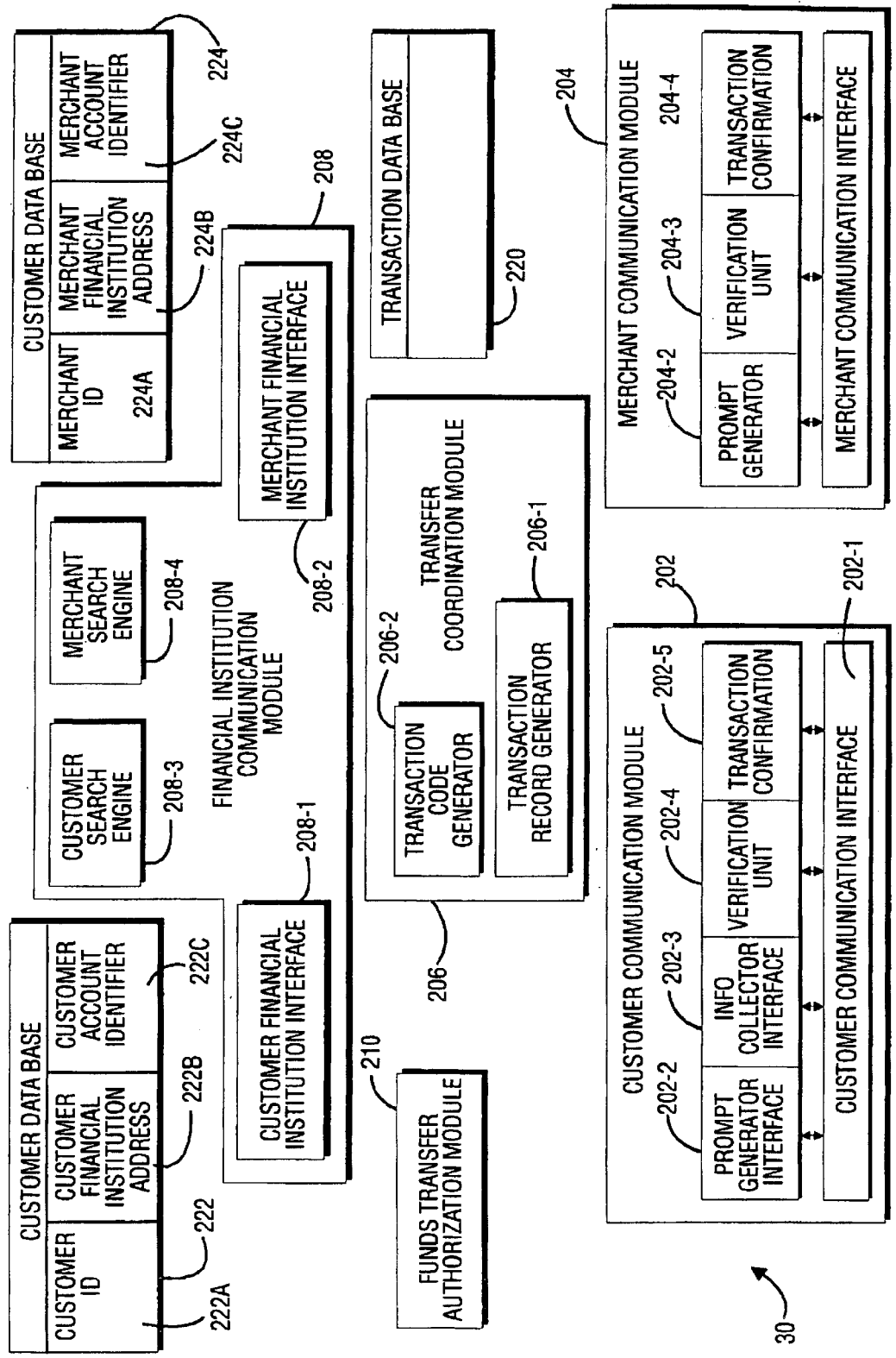
FIG. 2 is a schematic view of the service control node included in the telecommunications network of FIG. 1.

In one embodiment of the invention, the set of instructions and functions executed by telepay TSN 30 are modularized. In such embodiment, the modules of telepay TSN 30 as illustrated in FIG. 2 include customer communication module 202; merchant communication module 204; transfer communication module 206; financial institution communication module 208; and, funds authorization module 210.

Customer communication module 202 includes a customer communication interface 202-1 which handles communication with customer mobile station 60 over PSTN 50. Also included in customer communication mode 202 are prompt generator interface 202-2, information collector interface 202-3, verification unit 202-4, and transaction confirmation unit 202-5. Interface 202-2 and 202-3 are connected to peripheral 30P.

Similarly, merchant communication module 204 includes a merchant communication interface 204-1 which handles communications with merchant terminal 70 over PSTN 50. Also included in merchant communication module 204 are prompt generator interface 204-2; verification unit 204-3; and, transaction confirmation unit 204-4.

Transfer coordination module 206 includes a transaction record generator 206-1 and a transaction code generator 206-2. Transaction record generator 206-1 is used to build records for transaction data base 220. In addition to building transaction database 220, transfer coordination module 206 searches for and accesses records stored in transaction database 220.

Financial institution communication module 208 includes customer financial institution includes customer financial institution interface 208-1 and merchant financial institution interface 208-2. Financial institution communication module 208 also has a customer search engine 208-3 for searching a customer database 222 and a merchant search engine 208-4 for searching a merchant database 224.

For the embodiment shown in FIG. 2, customer database 222 has prestored therein a record for each customer who subscribes to the telepay service offered by telepay TSN 30. The record for each customer has at least three fields, including a customer identifier field 222A; a customer financial institution address field 222B; and, a customer account identifier field 222C. The customer account identifier field 222C is the customer's account number for the particular financial institution whose address appears in field 222B.

Similarly, the embodiment shown in FIG. 2, customer database 224 has prestored therein a record for each merchant who participates in the telepay service offered by telepay TSN 30. The record for each merchant has at least three fields, including a merchant identifier field 224A; a merchant financial institution address field 224B; and, a merchant account identifier field 224C. The merchant account identifier field 224C is the merchant's account number for the particular financial institution whose address appears in field 224B.

While databases 220, 222, and 224 have been illustrated in FIG. 2 as being included in telepay TSN 30, it should be understood that such need not necessarily be the case. For example, in an alternate embodiment databases 220, 222, and 224 can be located remotely, e.g., at one or more special nodes such as, for example, service data points (SDPs) of an intelligent telecommunications network.

Actions performed by telepay TSN 30 are understood as described in more detail in connection with FIG. 3A, FIG. 3B, and FIG. 3C and with contextual reference to FIG. 1. In the scenario briefly described above the customer and wants to pay $100US for a good or service. As depicted by event E1 in FIG. 1, the customer merely dials on customer mobile station 60 the directory number of the telepay TSN 30. The call is routed through PSTN 50, which includes mobile base station (BS) 52, and via MSC 54 and SSP 40 to telepay TSN 30, as shown by event E2. At telepay TSN 30, upon initially handling the call customer communications, module 202 obtains a customer identifier (e.g., customer directory number) from the call signaling which sets up the call (see step 300 in FIG. 3A).

Upon completion of the connection, customer communications module 202 directs peripheral 30C (via prompt generator interface 202-2) to issue a series of prompts which are transmitted over the call connection to customer mobile station 60. The prompts, depicted as event E3 in FIG. 1, are preferably audible prompts and/or displayed text prompts which request either a DTMF response (e.g., for the customer to select digits on the telephone keyboard in response to the prompt) or a voice response. As indicated by step 302 of FIG. 3A, the series of prompts includes a first prompt for entry of the merchant identifier and a second prompt for entry of the transaction amount. For security purposes, a third prompt for a customer personal identification number (PEN) may also be generated. All kinds of additional security functionality can be added either independently or additionally, such as cryptographic keys, fingerprint recognition at the mobile station, etc. Step 320 of FIG. 3A also shows information collector 202-3 of customer communication module 202 obtaining the customer input in response to each of the prompts generated by prompt generator 202-2. In FIG. 1, customer input in response to the prompts is indicated as event E4. The customer input is processed by peripheral 30P.

Upon collection of the information entered on customer mobile station 60 in response to the prompts of step 302, at step 304 the customer communication module 202 sends the information it has gleaned (as processed e.g. by the peripheral 30P) along with the customer identifier to transfer coordination module 206. Transaction record generator 206-1 of transfer coordination module 206 uses the information to build a record in transaction database 220 for the transaction (see step 304 of FIG. 3A). In connection with building the record for the transaction, transaction record generator 206-1 requests and obtains from transaction code generator 206-2 a unique transaction code or identifier for the transaction. Thus far, therefore, the record for the call includes the unique transaction code, the customer identifier, the merchant identifier, and the transaction amount.

At step 306, telepay TSN 30 determines the customer financial institution address and the customer account identifier at the customer financial institution. In particular, at step 306 the transfer coordination module 206 sends to the financial institution communication module 208 a signal which includes the current transaction code, the current customer identifier, and (optionally) the transaction amount. The current customer identifier included in this signal is used by customer search engine 208-3 to search customer data base 222. In particular, customer search engine 208-3 locates a record in data base 222 having the customer identifier in field 222A, and obtains the customer financial institution address and customer account identifier from fields 222B and 222C, respectively, of that record. The customer financial institution address is a telecommunications network directory number of the customer financial institution at which the customer financial institution is contactable and responds to an automatic interrogation and interchange as hereinafter described.

Telepay TSN 30 has, as an optional feature, an ability to assure that the customer account has sufficient funds to cover the transaction amount prior to effecting the transaction. In this regard, and as indicated by step 314, customer financial institution interface 208-1 is directed to send the customer financial institution an authorization assurance request message. The authorization assurance request message is routed by customer financial institution interface 208-1 over data network N to the customer financial institution address obtained at step 314. The authorization assurance request message, indicated as event E5 in FIG. 1, includes the transaction code, the customer account identifier, the transaction amount, and a message type code. The message type specifically indicates that telepay TSN 30 is seeking to determine whether the customer financial institution 80 will authorize a funds transfer from the customer account in the amount of the transaction amount. Assuming authorization is granted, an authorization assurance message is transmitted over data network N by customer financial institution 80 to customer financial institution interface 208-1, as depicted by event E6 in FIG. 1.

Figure 3A:
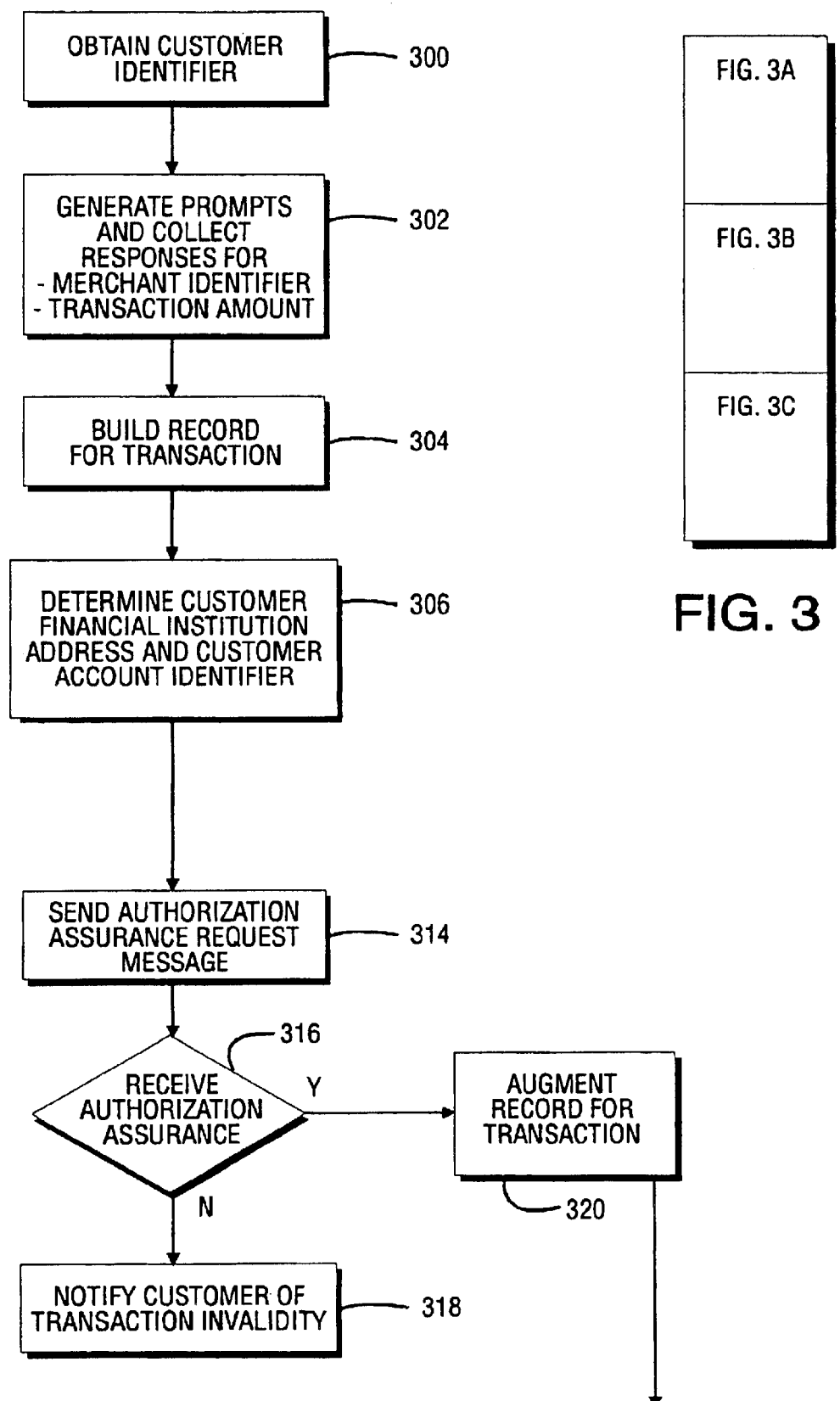
FIG. 3A, FIG. 3B, and FIG. 3C are flowcharts showing steps executed by a service control node according to the invention.
Figure 3B:
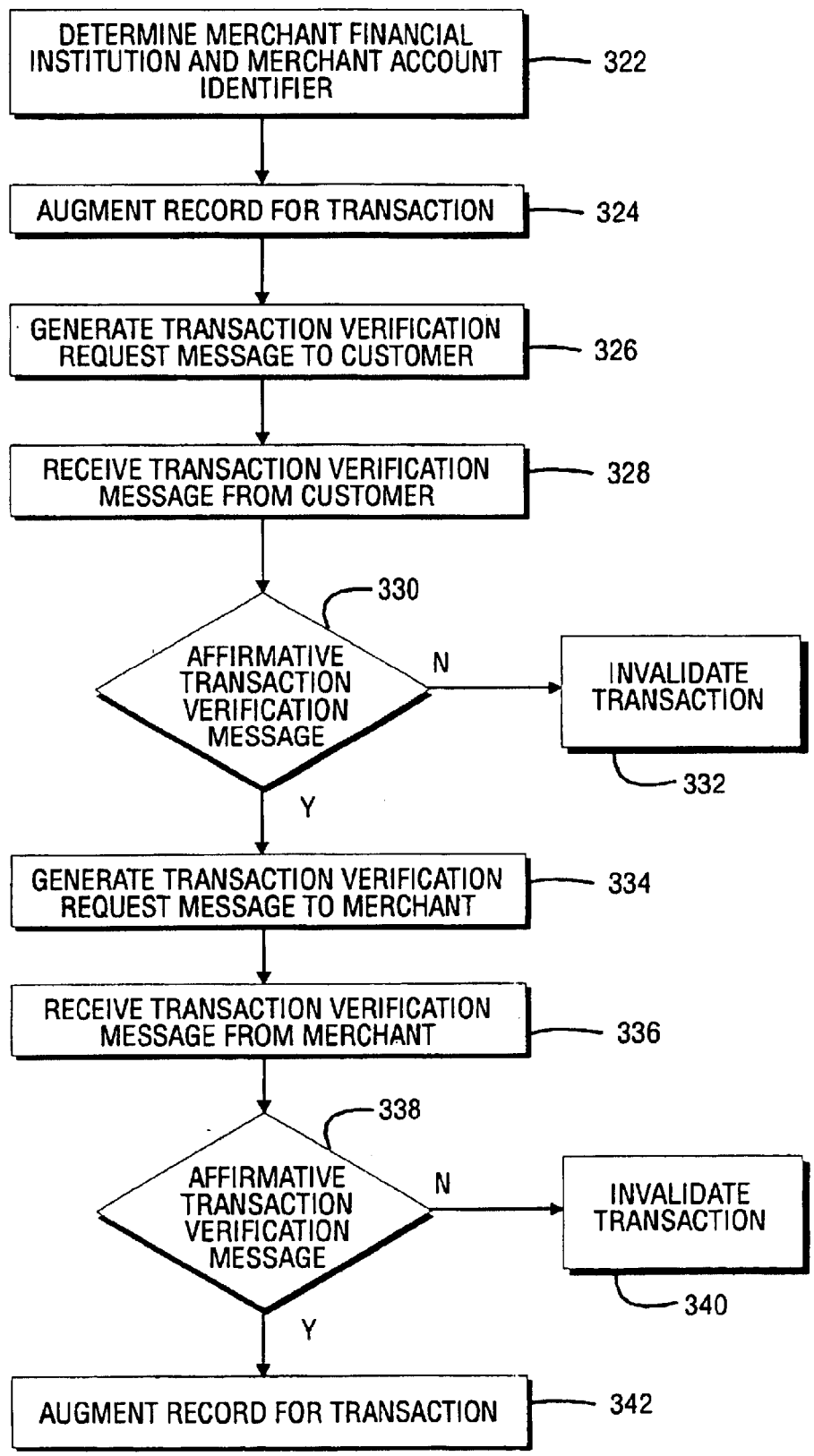
Figure 3C:
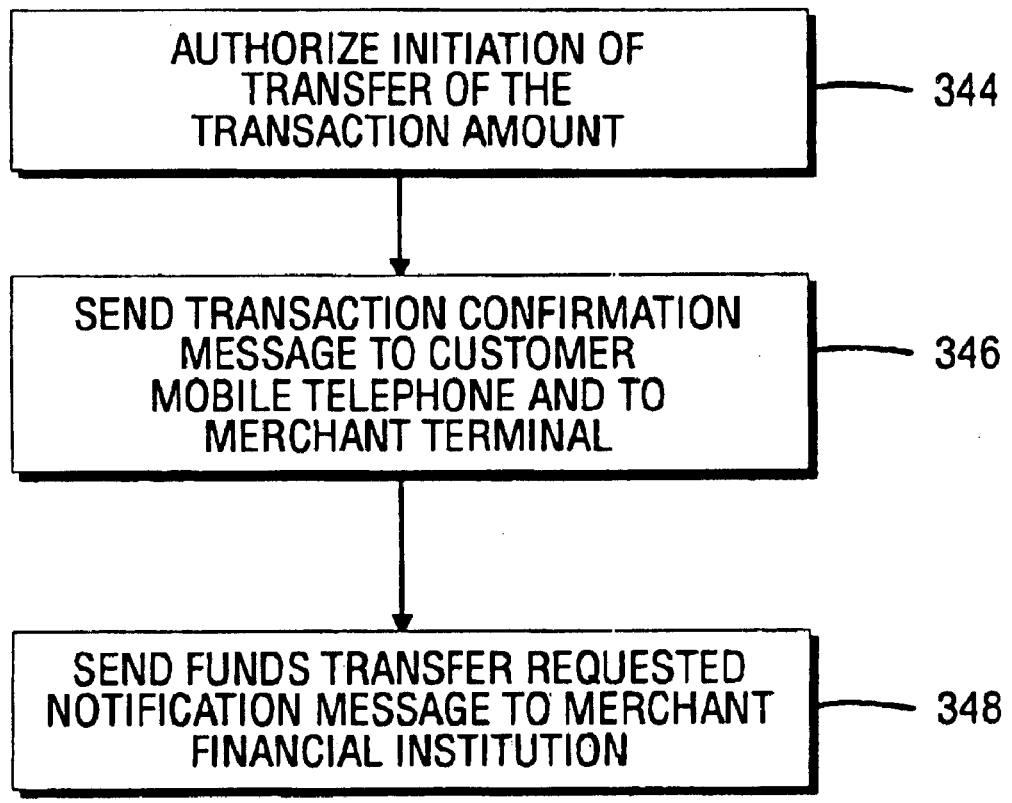

As indicated by step 316 of FIG. 3A, if the authorization assurance message is negative (indicating that authorization is not granted), an invalid transaction notification is sent to customer mobile station 60 (see step 318). Otherwise, as shown by step 320, the customer financial institution address and customer account identifier obtained from step 306, along with an indication of receipt of a positive authorization assurance message, are stored in the record for the current transaction in transaction database 220.

At step 322 the transfer coordination module 206 verifies that a valid merchant identifier was entered and determines the merchant financial institution address and the merchant account identifier at the merchant financial institution. In like manner as with step 306, at step 322 the transfer coordination module 206 sends a signal to merchant search engine 208-4, the signal including the current transaction code and the current merchant identifier. Merchant search engine 208-4 searches merchant data base 224 for a record having the current merchant identifier in field 224A. Upon finding such a record, merchant search engine 208-4 obtains the corresponding merchant financial institution address and the merchant account identifier from fields 224B and 224C, respectively, of that record. Then, merchant search engine 208-4 sends a signal to transfer coordination module 206 which includes the current transaction code, the merchant identifier, and the merchant financial institution address and the merchant account identifier obtained from the thusly located record. Transfer coordination module 206 augments the record for the current transaction with the merchant financial institution address and the merchant account identifier (step 324).

It is noted in passing, that should the merchant identifier not be found in data base 224 upon performance of step 322, an invalid transaction notification is sent to customer mobile station 60. Similarly, if the customer identifier were not located in customer data base 222 at step 306, an invalid transaction notification would be sent to customer mobile station 60.

At step 326, transfer coordination module 206 directs that a transaction verification request message be sent to customer mobile station 60. In this regard, transfer coordination module 206 provides verification unit 202-4 with the current transaction code, the merchant identifier, and the transaction amount. Verification unit 202-4 in turn generates a verification request message which is transmitted to customer mobile station 60 and depicted as event E7 in FIG. 1. Verification request message can take the form of an audible message or, when customer mobile station 60 is suitably equipped, a digital display. The verification request message includes a prompt requesting that the customer verify that the transaction is to proceed.

If the customer agrees with the information provided in the transaction verification request message, the customer responds with an affirmative transaction verification message (as indicated by event E8 in FIG. 1). Step 328 shows receipt of the transaction verification message from customer mobile station 60. Should it be determined at step 330 that the transaction verification message is negative, the transaction is invalidated and terminated as indicated by step 332.

In like manner with step 326, at step 334 transfer coordination module 206 directs that a transaction verification request message be sent to merchant terminal 70. In this regard, transfer coordination module 206 provides verification unit 204-3 with the current to transaction code, the merchant identifier, and the transaction amount. Verification unit 204-3 in turn generates a verification request message which is transmitted to merchant terminal 70 and depicted as event E9 in FIG. 1. This verification request message preferably takes the form of a digital display at merchant terminal 70. The verification request message includes a prompt requesting that the merchant verify that the transaction is to proceed. If the merchant agrees with the information provided in the transaction verification request message, the customer responds with an affirmative transaction verification message (as indicated by event E10 in FIG. 1). Step 336 shows receipt of the transaction verification message from merchant terminal 70. Should it be determined at step 338 that the transaction verification message is negative, the transaction is invalidated and terminated as indicated by step 340.

It should be understood that the merchant verification process of steps 334, 336, and 338 can be conducted before or essentially contemporaneous with the customer verification process of steps 326, 328 and 330.

Alternatively, in one embodiment a transaction verification request message may be sent only to one party, e.g., to customer mobile station 60 and not to merchant terminal 70.

Assuming that affirmative transaction verification messages are received both from the customer mobile station 60 and merchant terminal 70 in the embodiment currently described, transfer coordination module 206 is so apprised and, at step 342, updates the record for the current transaction to indicate verification by both parties.

With the transaction approved by both parties, at step 344 transfer coordination module 206 directs the funds transfer authorization module 210 to authorize initiation of transfer of the transaction amount from the customer account to the merchant account. Along with this directive, funds transfer authorization module 210 is provided the transaction code, the transaction amount, the customer financial institution address, the customer account identifier, the merchant financial institution address, and the merchant account identifier. As indicated by event E11 in FIG. 1, funds transfer authorization module 210 then signals the customer financial institution 80 over data network N with a funds transfer request message. The signal is sent using the customer financial institution interface 208-1 of financial institution communication module 208 (see FIG. 2). The signal includes a message code type indicative of a funds transfer request, the transaction code, the transaction amount, the customer financial institution address, the customer account identifier, the merchant financial institution address, and the merchant account identifier.

Upon authorizing initiation of the funds transfer, at step 346 transfer coordination module 206 also directs that a transaction confirmation message be sent to customer mobile station 60 (as event E12) and to merchant terminal 70 (as event E13). The transaction confirmation message is sent to customer mobile station 60 via transaction confirmation unit 202-5 and to merchant terminal 70 via transaction confirmation unit 204-4.

Step 348 also shows transfer coordination module 206 sending a funds transfer requested notification message to merchant financial institution 90 over data network N. The funds transfer requested notification message alerts institution 90 to expect to receive eventually a transfer of the transaction amount to the merchant account maintained at merchant financial institution 90 from the customer financial institution 80. Such funds transfer requested notification message is depicted as event E14 in FIG. 1.

Customer financial institution 80 can immediately transfer funds from the customer account to the merchant account at merchant financial institution 90, e.g., in accordance with usual banking procedures. For sake of simplicity, such transfer is depicted in FIG. 1 as event E15. As an option, customer financial institution 80 can also send to telepay TSN 30 a confirmation that the funds have been transferred from customer financial institution 80 to merchant financial institution 90. Merchant financial institution 90 in turn credits the merchant account with the transaction amount, which credit may possibly occur after a "float" delay.

Figure 1A:
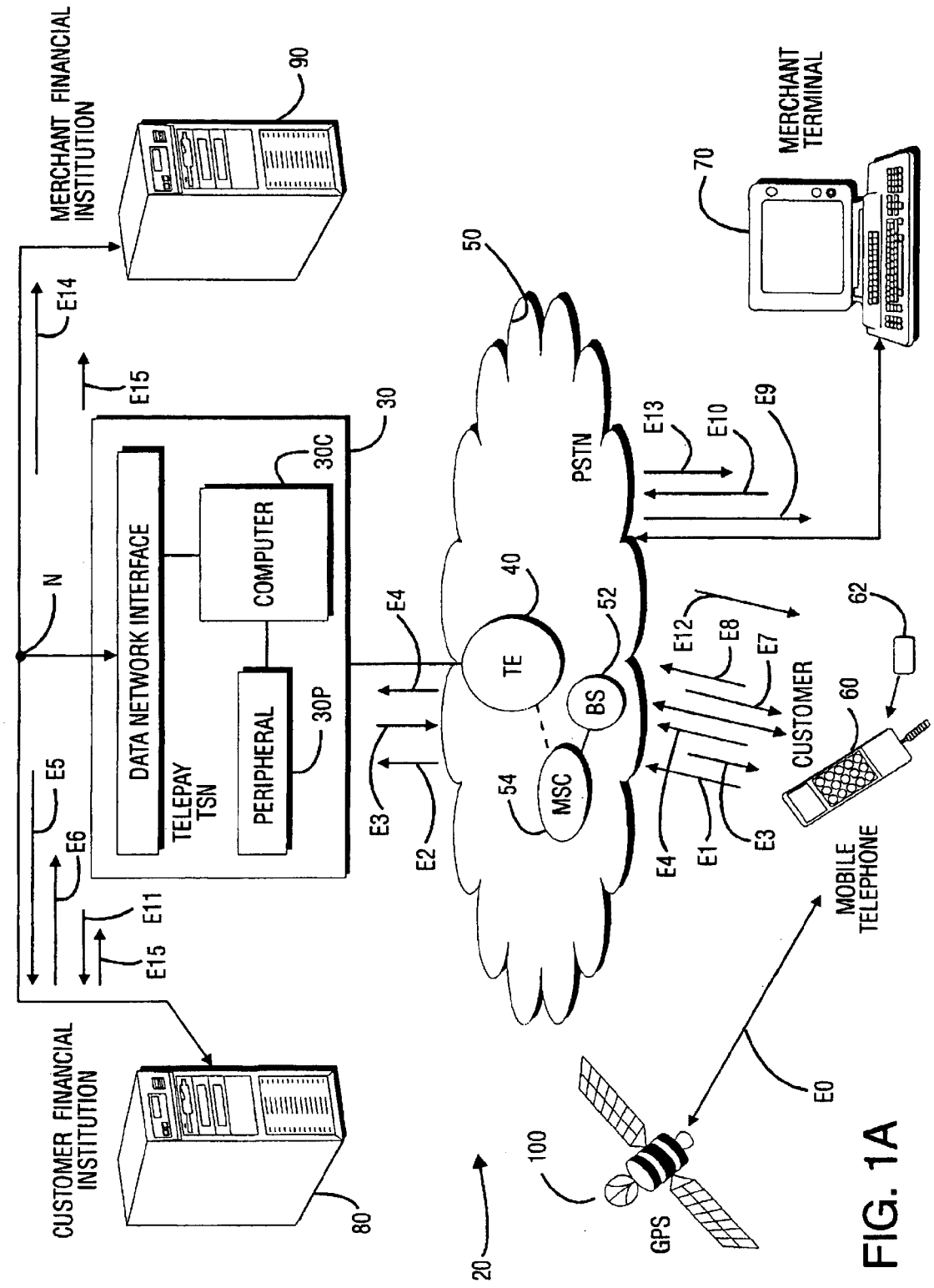
FIG. 1A is a schematic view of a tele/datacommunications network including a node which provides a telepayment service according to another embodiment of the invention.

The system of FIG. 1A differs from that of FIG. 1 e.g., in that customer mobile station 60 includes a GPS (global positioning system) communication transponder 62. GPS transponder 62 serves to interrogate a GPS satellite 100 and to obtain therefrom a GPS response which indicates the current GPS coordinates of customer mobile station 60. Event E0 of FIG. 1A depicts interrogation and response of GPS satellite 100 by customer mobile station 60. GPS interrogation and response can occur periodically during activation of customer mobile station 60. Alternatively, customer mobile station 60 can be programmed to interrogate GPS satellite 100 upon detection of the dialing of the digits of the telepayment service of the present invention.

The current GPS location coordinates of customer mobile station 60 are transmitted to telepay SCP 30 and received by information collector 202-3 of customer communication module 202. Transmission of the current GPS location coordinates can occur in number of ways. For example, upon completion of call connection prompt generator 202 may issue a tone which is recognized by customer mobile station 60 as requiring customer mobile station 60 to send the current GPS location coordinates of customer mobile station 60 to telepay TSN 30. Alternatively, upon completion of call connection, the customer mobile station 60 may (on its own initiative) transmit its current GPS location coordinates at a predetermined time. Regardless of timing and manner of transmission, the transmission of the current GPS location coordinates is governed by the protocol between customer mobile station 60 and telepay TSN 30.

Figure 2A:
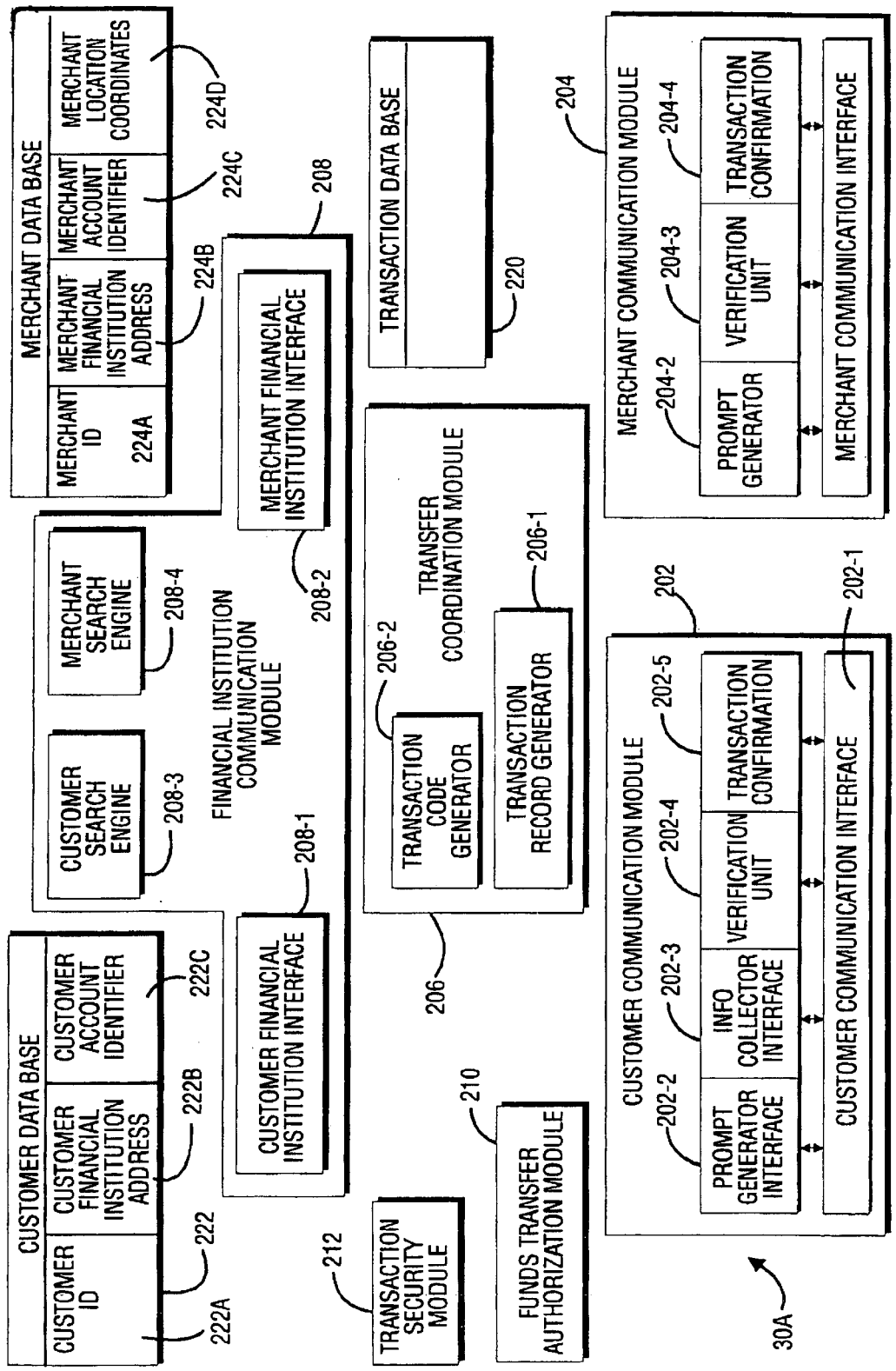
FIG. 2A is a schematic view of the service control node included in the telecommunications network of FIG. 1A for a first and second mode of the invention.

FIG. 2A shows an embodiment of telepay TSN 30A(1) suitable for the first mode of the invention, i.e., the mode illustrated in FIG. 5A in which the customer's mobile station is proximate the merchant's premises. The telepay TSN 30A(1) of FIG. 2A resembles that of FIG. 2 but in addition includes transaction security module 212A. Further, merchant data base 224 of FIG. 2 contains an additional field for each merchant record, particularly a field 224D. Field 224D has prestored therein the merchant location (GPS) coordinates.

Figure 4:
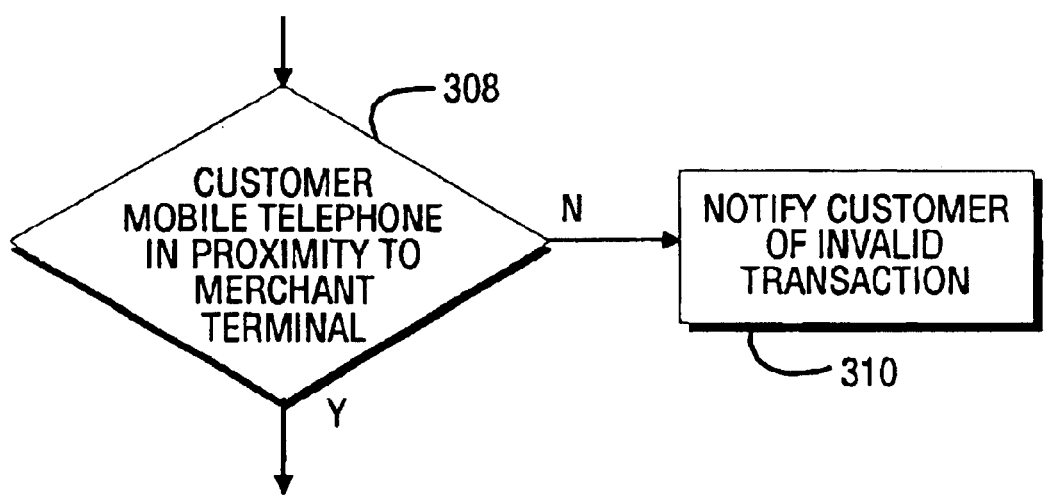
FIG. 4A is a flowchart showing additional steps executed by a service control node in connection with a security feature of a first mode of the invention.
FIG. 4B is a flowchart showing additional steps executed by a service control node in connection with a security feature of a second mode of the invention.

For telepay TSN 30A(1) of FIG. 2A, an additional field of information is obtained at step 306, particularly the merchant location coordinates of field 224D. In performance of its operations, telepay SCP 30 otherwise executes steps similar to those shown in FIG. 3A, FIG. 3B, and FIG. 3C. In addition, telepay TSN 30A(1) executes the steps shown in FIG. 4.

Figure 4A:
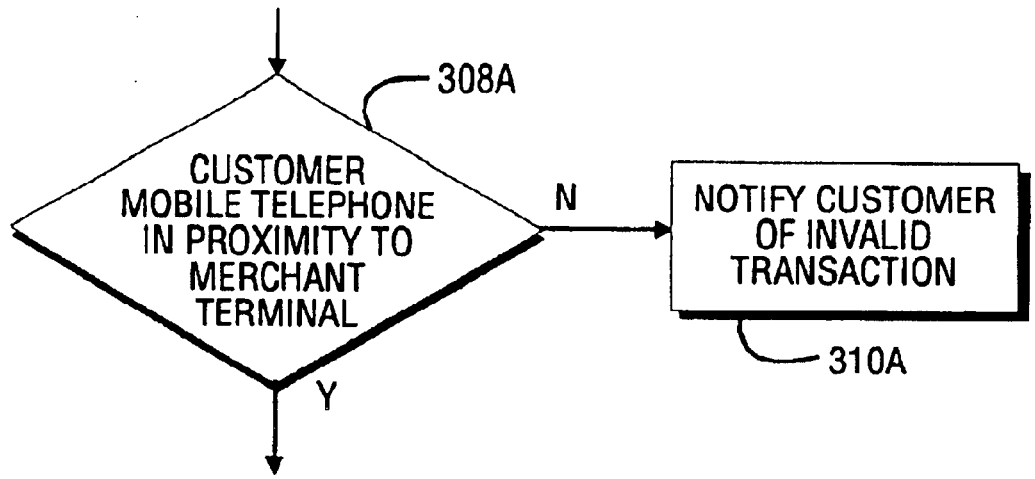

At step 308A of FIG. 4A, transaction security module checks whether customer mobile station 60 is within a predetermined geographical proximity of merchant terminal 70. In particular, transfer communication module 206 passes to transaction security module 212 the merchant GPS location coordinates obtained at step 306 and the current GPS coordinates of customer mobile station 60. Transaction security module 212 then compares the merchant GPS location coordinates obtained at step 306 and the current GPS coordinates of customer mobile station 60. If the two sets of coordinates are not within an acceptable proximity range, transaction security module 212A issues a signal to transfer communication module 206 indicating that the transaction should be invalidated. Transfer communication module 206 responds by notifying the customer of transaction invalidity and by terminating the transaction (step 310A). On the other hand, if the two sets of coordinates are within an acceptable proximity range, transaction security module 212A issues a signal to transfer communication module 206 indicating that the transaction is valid. Transfer communication module 206 then proceeds to the next step, e.g., step 314 of FIG. 3A.

Thus, in the embodiment described in FIG. 1A and FIG. 2A, telepay TSN 30 confirms that customer mobile station 60 is within a predetermined geographical proximity of merchant terminal 70 prior to requesting transfer of the transaction amount from the customer account to the merchant account of the merchant financial institution. The geographical proximity check is a safeguard which precludes purchases unless the customer is actually physically present at the merchant's place of business.

FIG. 2A shows an embodiment of telepay TSN 30A(1) suitable for the second mode of the invention, i.e., the mode illustrated in FIG. 5B and in FIG. 5C in which the customer's mobile station is at customer's predetermined native location. The telepay TSN 30A(2) of FIG. 2A resembles that of FIG. 2 but in addition includes transaction security module 212B. Further, customer data base 222 of FIG. 2A contains an additional field for each customer record, particularly a field 222D. Field 222D has prestored therein one or more sets of customer location (GPS) coordinates, e.g., the coordinates of the customer's predetermined native location(s).

For telepay TSN 30A(2) of FIG. 2A, an additional field of information is obtained at step 306, particularly the customer location coordinates of field 222D. In performance of its operations, telepay SCP 30A(2) otherwise executes steps similar to those shown in FIG. 3A, FIG. 3B, and FIG. 3C. In addition, telepay TSN 30A(2) executes the steps shown in FIG. 4B.

Figure 4B:
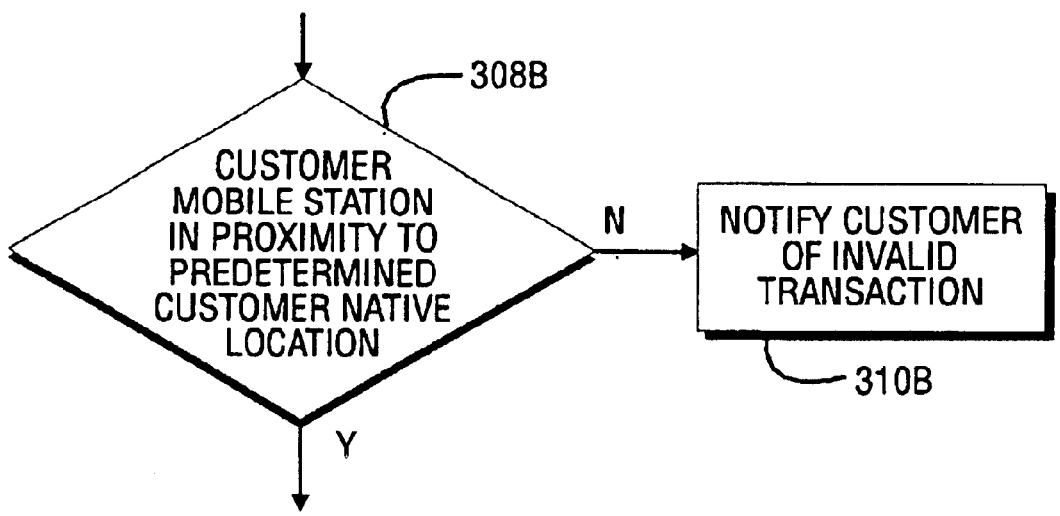

At step 308B of FIG. 4B, transaction security module checks whether customer mobile station 60 is within a predetermined geographical proximity of a registered customer predetermined native location. In particular, transfer communication module 206 passes to transaction security module 212 the customer GPS location coordinates obtained at step 306 and the current GPS coordinates of customer mobile station 60. Transaction security module 212 then compares the customer GPS location coordinates obtained at step 306 and the current GPS coordinates of customer mobile station 60. If the two sets of coordinates are not within an acceptable proximity range, transaction security module 212B issues a signal to transfer communication module 206 indicating that the transaction should be invalidated. Transfer communication module 206 responds by notifying the customer of transaction invalidity and by terminating the transaction (step 310B). On the other hand, if the two sets of coordinates are within an acceptable proximity range, transaction security module 212 issues a signal to transfer communication module 206 indicating that the transaction is valid. Transfer communication module 206 then proceeds to the next step, e.g., step 314 of FIG. 3A.

Thus, in the embodiment described in FIG. 1A and FIG. 2A, telepay TSN 30 confirms that customer mobile station 60 is within a predetermined geographical proximity of one of the customer's predetermined native locations prior to requesting transfer of the transaction amount from the customer account to the merchant account of the merchant financial institution. The geographical proximity check is a safeguard which precludes purchases unless the customer is actually physically present at a location which the customer has previously registered with telepay TSN 30.

While the FIG. 1A and FIG. 2A embodiment of the invention requires customer presence and/or predetermined location as a security feature, the, presence of a credit card or check is not required for the transaction. The only equipment required is the customer mobile station 60. In one embodiment, the invention requires that the customer also know a customer account identifier (PIN) in order to effect the transaction with a measure of security.

Security based on geographic proximity can also be accomplished in ways other than using GPS technology. For example, geographic location of customer mobile station 60 can be accomplished using very accurate clocks and measuring the radio propagation times for the mobile signal relative to different radio base stations. As another simple but less accurate example, TSN 30 can interrogate the mobile network subscriber database (e.g, a home location register [HLR] in GSM) to inquire as to which MSC and which radio base station is handling the customer's mobile station 60 to determine where customer mobile station 60 is located. Upon receipt of a response to the interrogation, the returned information, being indicative of the geographical location of customer mobile station 60, is compared with the pre-stored location of merchant terminal 70.

In the foregoing embodiments, telepay TSN 30 has been described as a special purpose node which serves as a termination point for call connection from the customer's mobile station 60. In such embodiments, no protocol is employed between MSC 54 and telepay TSN 30. Moreover, telepay TSN 30 includes (or has connected thereto) the intelligent peripheral 30P.

Figure 1B:
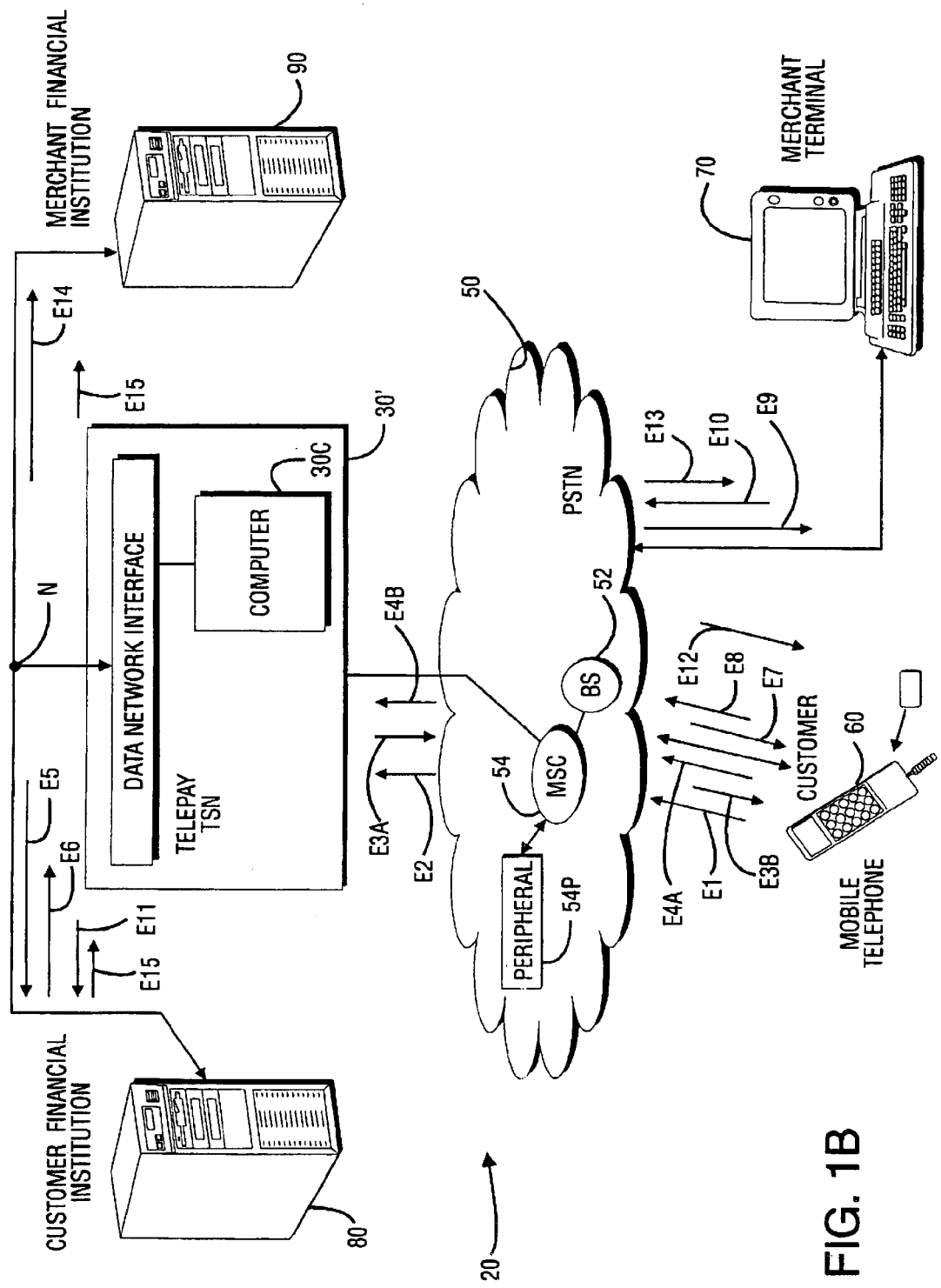
FIG. 1B is a schematic view of a tele/datacommunications network including a service control node of an intelligent network which provides a telepayment service according to an embodiment of the invention.

The embodiment of telepay node 30' shown in FIG. 1B, on the other hand, is not a special purpose node but rather a service control point (SCP) of an intelligent network. In the embodiment of FIG. 1, a call made from the customer's mobile station 60 is terminated at mobile switching center (MSC) 54. MSC 54 includes certain service switching function software which enables MSC 54 to function like a service switching point (SSP). Upon reception of the call from the customer's mobile station 60, MSC 54 signals with telepay TSN 30' using INAP (Intelligent Network Application Part protocol) over CCITT signaling system No. 7. For this reason, what was shown in FIG. 1 as a single event E2 is shown in FIG. 1B as event E2A (call connection from customer mobile station 60 to MSC 54) and event E2B (signaling from MSC 54 to telepay TSN 30').

Thus, the embodiment of FIG. 1B differs from those previously described in that MSC 54 serves as the call connection node, and communication between MSC 54 and telepay TSN 30' occurs by signaling. Such being the case, in the embodiment of FIG. 1B, no intelligent peripheral 30P is provided at telepay TSN 30, but is instead moved to MSC 54 where it appears as peripheral 54P. When prompts such as tone and/or voice prompts are directed by telepay TSN 30' as is indicated by event E3A, such directives are transmitted by signaling to MSC 54, and then to intelligent peripheral 54P. Intelligent peripheral 54P then generates the prompts for application (e.g., event E3B) to the intended recipient e.g., mobile station 60. Similarly, intelligent peripheral 54P interprets any DTMF tones inputted by the customer (e.g., PIN) at event E4A, whereupon the interpreted information (e.g., PIN) is signaled as event E4B from MSC 54 to telepay TSN 30'. Although not expressly shown in FIG. 1B, it should be understood that subsequent communications with customer mobile station 60, as well as merchant terminal 70 (e.g., verification and response), are accomplished using signaling between MSC 54 and telepay TSN 30'.

The embodiment of FIG. 1B is also optionally implemented using the above-described security features, such as GPS, for example. Such implementation is readily ascertained from the preceding discussions.

Whereas the embodiments of FIG. 1 and FIG. 1A are simple and perhaps less expensive to implement in low traffic situations, the embodiment of FIG. 1B has greater capacity and scalability.

All embodiments herein described can be realized on a general computer with UNIX or Windows NT, or other general purpose operating system based on special purpose computers, such as the Ericsson APZ Telecom Purpose Computer, for example. For implementation in a European country, for example, the telepay TSN nodes can communicate in MAP protocol to the GSM HLR database, over signaling no. 7 (SS7) or TCP/IP, for example.

The present invention can be enhanced using encryption techniques for communications between telepay TSN 30 on the one hand an customer mobile station 60 and merchant terminal 70 on the other. Encryption can be accomplished, for example, using a SIM (subscriber identification mobile) card in customer mobile station 60 and a similar encryption card at customer terminal 70.

Further, the SIM (subscriber identification mobile) card utilized by customer mobile station 60 of the present invention can also serve as a credit card, in which case payment can be debited to the customer's credit card account or telephone bill. In this regard, the SIM card has the customer's account number stored therein, which account number can be automatically communicated by customer mobile station unit 60 to telepay TSN 30. For example, telepay TSN 30 can issue a special interrogation (e.g., a message in the signaling link to the mobile station or a tone) to customer mobile station unit 60 which is detected and interpreted by the SIM card, and to which the SIM card causes station 60 to respond automatically with the customer's account stored in the SIM card. In the case of such prestorage of customer account information in a SIM card, there need be no look up at telepay TSN 30 for the customer's account number. A database look up process can be utilized to determine a network address for the financial institution which administers the account. Telepay TSN 30 can then provide the transaction amount and customer account number to the financial institution, whereupon the financial institution prepares an appropriate statement (e.g., credit card statement or telephone bill) which includes the transaction amount.

Prompts utilized by telepay TSN 30, such as those for entry of data (e.g., transaction amount, merchant identifier) and verification, can utilize short message service features for the display of text on telephones and terminals having suitable display units. For short message service (SMS), telepay TSN 30 signals either a SMS server (provided in GSM or equivalent systems) or the home location register (HLR). Alternatively, in an intelligent network environment, telepayTSN 30' can signal a SCP, which in turn can signal the SMS server or HLR, which in turn signal the MSC 54 for contacting the mobile station or terminal.

In some embodiments the customer line identity (e.g., calling party's directory number) is used as the customer's billing number, or alternatively is used to look up (in a database) an account number corresponding to the customer line identity. In most modern networks such as ISDN, the customer line identity (CLI) is signaled all the way through to the end user equipment, thereby facilitating such services as Calling Line Identification ("Caller ID"). Accordingly, one implementation for debiting the mobile customer is to get the CLI directly if an appropriate signaling protocol is used to telepay TSN 30 (for TSN 30 not being an SCP-type node). If telepay TSN 30 is a SCP-type node, the SSP obtains the mobile number (CLI) via the network signaling (e.g., ISUP or TUP protocols according to ITU standards) and sends the CLI to the SCP via the INAP protocol. Thus, telepay TSN 30 does not have to interrogate the customer mobile unit 60 for its account number.

In addition to the security features described above, a protocol specific to each mobile standard on top of signaling no. 7 interface (or TCPIP or X.25) to mobile network can be employed to connect to different databases that can give useful information on the mobile handset and its owner, i.e. whether the handset is a valid subscriber, if it has been reported stolen, which radio cells its signal is received by, signal strength and cell locations (in GSM e.g. Home Location Register, Equipment Identity Register, Authentication Centre). This information can also be used as data to validate the transaction—e.g. a stolen handset can not pay for purchases, and a handset can not verify a purchase in a shop in New York if the radio cell to which it is connected is in San Francisco.

In the embodiments of FIG. 5B and FIG. 5C, the merchant's web page is generated and transmitted by a web server 71 (which may, or may not, be at the merchant's premises). The mechanics of Web page generation and transmission is not germane to the present invention. Standard internet protocols and security funtionality can be employed. The information conveyed on the Web page is pertinent, in that such information either presents or enables the customer to acquire financial information in the nature of e.g., an advertisement or a bill. The advertisement may provide a description of a product or service, as well as a cost (transaction amount) and a merchant identifier, and perhaps a transaction code or the like to identify the particular advertised item or bill (invoice) number or account number.

As one example, in the manner illustrated in FIG. 5B, at home a customer on computer 64 may reach the Web page of a utility company in order to pay, for example, a utility bill. By entering the customer's name or account number with the utility company (and possibly a PIN or the like for security reasons), the customer is linked to a display of the customer's present utility bill. The display provides the transaction amount (current balance due), as well as a merchant identifier and possibly a transaction code. The customer then dials the Telepay TSN number using the customer's mobile station 60, and in response to prompts enters e.g., the merchant identifier and transaction amount (and possibly the transaction code). If the customer is situated at one of the customer's predetermined native locations, the transaction is completed in the manner described herein.

In the embodiment of FIG. 5C, both internet access and access to Telepay TSN 30 are accomplished using mobile station 60 in the form of laptop computer 60 with mobile termination. In this embodiment, laptop computer 60 and the mobile network are capable of having multiple connections between the network and a mobile station.

The present invention thus facilitates funds transfer for payment of goods and/or services without use of a credit card, bank check or the like; is essentially immediate, simple, and secure.

While the invention has been particularly shown and described with reference to the preferred embodiments thereof, it will be understood by those skilled in the art that various alterations in form and detail may be made therein without departing from the spirit and scope of the invention.

What is claimed is:

1. A method of facilitating automated payment from a customer account of a customer financial institution to a merchant account of a merchant financial institution, the method including:

acquiring a merchant identifier and transaction amount from a customer mobile station;

verifying the transaction amount with a merchant terminal;

determining whether the customer mobile station and the merchant terminal are within a predetermined geographical proximity;

upon receipt of a verification from the merchant terminal, requesting transfer of the transaction amount from the customer account to the merchant account; and transferring the transaction amount from the customer account to the merchant account only if the customer mobile station and the merchant terminal are within the predetermined geographical proximity as a security safeguard to assure that the customer mobile station is actually proximate the merchant terminal at the time of requesting transfer.

2. The method of claim 1, further comprising consulting a customer data base wherein is stored for the customer (1)

a telecommunications address of the customer financial institution and (2) a customer account identifier.

3. The method of claim 1, further comprising consulting a merchant data base wherein is stored for the merchant identifier (1) a telecommunications address of the merchant financial institution and (2) a merchant account identifier.

4. The method of claim 1, further comprising obtaining geographic coordinates of the customer mobile station, and comparing the geographic coordinates of the customer mobile station with geographic coordinates of the merchant terminal to determine whether the customer mobile station and the merchant terminal are within the predetermined geographical proximity.

5. The method of claim 4, wherein the geographic coordinates of the customer mobile station are GPS coordinates.

6. The method of claim 1, wherein the merchant identifier is acquired from a display on a computer screen.

7. The method of claim 1, further comprising telephonically interfacing with a data base at the customer financial institution to determine whether debiting of the customer account by the transaction amount is authorized.

8. A method for facilitating automated funds transfer of a transaction amount, the method comprising:

determining, at a service node of a telecommunications network, whether a customer mobile station and a merchant terminal are within a predetermined geographical proximity as a security safeguard to assure that the customer mobile station is actually proximate the merchant terminal; and in response to the determining, arranging, at the service node and in response to a request from the customer mobile station, transfer of a transaction amount from a customer account of a customer financial institution to a merchant account of a merchant financial institution.

9. The method of claim 8, further comprising using a merchant identifier provided on a display on a computer screen for ascertaining the merchant account.

10. The method of claim 8 further comprising obtaining geographic coordinates of the customer mobile station, and comparing the geographic coordinates of the customer mobile station with geographic coordinates of the merchant terminal to determine whether the customer mobile station and the merchant terminal are within the predetermined geographical proximity.

11. A method for facilitating automated funds transfer of a transaction amount, the method comprising:

determining, at a service node of a telecommunications network, whether a customer mobile station and a merchant terminal are within a predetermined geographical proximity as a security safeguard to assure that the customer mobile station is actually proximate the merchant terminal; and in response to the determining, arranging, at the service node and in response to request from the customer mobile station, for a credit message to be sent to a merchant account of a merchant financial institution and a debit message to be sent to a customer account of a customer financial institution.

12. The method of claim 11, further comprising using a merchant identifier provided on a display on a computer screen for ascertaining the merchant account.

13. A telecommunications service for facilitating funds transfer of a transaction amount, the service comprising:

a customer mobile station;

a merchant terminal;

a customer financial institution;

a merchant financial institution;

a service node which, in response to a request from the customer mobile station, arranges for transfer of a transaction amount from a customer account of the customer financial institution to a merchant account of the merchant financial institution provided that the service node determines that the customer mobile station and the merchant terminal are within a predetermined geographical proximity as a security safeguard to assure that the customer mobile station is actually proximate the merchant terminal; and a mobile switching center connected to the service node, to the customer mobile station, and to the merchant terminal; and, a data network which connects the service node to the customer financial institution and to the merchant financial institution.

14. The system of claim 13, further comprising using a merchant identifier provided on a display on a computer screen for ascertaining the merchant account.

15. A service node of a telecommunications network comprising:

a processor which, in response to a request from a customer mobile station, performs a transfer of a transaction amount from a customer account of a customer financial institution to a merchant account of a merchant financial institution provided that the service node determines as a security safeguard that the customer mobile station and the merchant terminal are within a predetermined geographical proximity;

an interface which connects the processor to the network.

16. A telecommunications service for facilitating funds transfer of a transaction amount, the service comprising:

a customer mobile station;

a merchant terminal;

a customer financial institution;

a merchant financial institution;

a service node which, in response to a call from the customer mobile station;

(1) acquires a merchant identifier and transaction amount from the customer mobile station;

(2) verifies the transaction amount with the merchant terminal; and (3) upon receipt of a verification, requests transfer of the transaction amount from the customer account to a merchant account of the merchant financial institution;

(4) determines whether the customer mobile station and the merchant terminal are within a predetermined geographical proximity prior to requesting transfer of the transaction amount from the customer account to the merchant account of the merchant financial institution as a security safeguard to assure that the customer mobile station is actually proximate the merchant terminal at the time of requesting transfer; and a mobile switching center connected to the service node, to the customer mobile station, and to the merchant terminal; and, a data network which connects the service node to the customer financial institution and to the merchant financial institution.

17. The apparatus of claim 16, further wherein the service node obtains geographic coordinates of the customer mobile station, and wherein the service node compares the geographic coordinates of the customer mobile station with geographic coordinates of the merchant terminal to determine whether the customer mobile station and the merchant terminal are within a predetermined geographical proximity.

18. The apparatus of claim 17, wherein the geographic coordinates of the customer mobile station are GPS coordinates.

19. The apparatus of claim 16, further comprising a customer data base wherein is stored for the customer (1) a telecommunications address of the customer financial institution and (2) a customer account identifier.

20. The apparatus of claim 16, further comprising a merchant data base wherein is stored for the merchant identifier (1) a telecommunications address of the merchant financial institution and (2) a merchant account identifier.

21. The apparatus of claim 16, wherein the service node communicates with the customer financial institution to determine whether debiting of a customer account by the transaction amount is authorized.

22. The apparatus of claim 21, wherein information ascertained from a display on a computer screen is used as the merchant identifier.

23. A node of a telecommunications network which facilitates payment from a customer account of a customer financial institution to a merchant account of a merchant financial institution, the node comprising:
   a customer communication module which requires a merchant identifier and a transaction amount from a customer mobile station;
   a merchant communication module which verifies the transaction amount with a merchant terminal;
   a funds transfer authorization module which, upon receipt by the merchant communication module of a verification from the merchant terminal, requests transfer of the transaction amount from the customer account to the merchant account; and
   a transaction security module which determines whether the customer mobile station and the merchant terminal are within a predetermined geographical proximity, and wherein transfer of the transaction amount from the customer account to the merchant account is precluded unless the customer mobile station and the merchant terminal are within the predetermined geographical proximity as a security safeguard to assure that the customer mobile station is actually proximate the merchant terminal at the time of requesting transfer.

24. The apparatus of claim 23, wherein the node is a service control point of an intelligent telecommunications network.

25. The apparatus of claim 23, wherein the node is a special function node.

26. The apparatus of claim 23, further comprising a customer data base wherein is stored for the customer (1) a telecommunications address of the customer financial institution and (2) a customer account identifier.

27. The apparatus of claim 23, further comprising a merchant data base wherein is stored for the merchant identifier (1) a telecommunications address of the merchant financial institution and (2) a merchant account identifier.

28. The apparatus of claim 23, wherein the transaction security module obtains geographic coordinates of the customer mobile station, and wherein the transaction security module compares the geographic coordinates of the customer mobile station with geographic coordinates of the merchant terminal to determine whether the customer mobile station and the merchant terminal are within the predetermined geographical proximity.

29. The apparatus of claim 23, further comprising a financial institution module which communicates with the customer financial institution to determine whether debiting of the customer account by the transaction amount is authorized.

30. A method of facilitating automated payment from a customer account of a customer financial institution to a merchant account of a merchant financial institution, the method including:
   acquiring a merchant identifier and transaction amount from a computer screen which displays the merchant identifier;
   determining whether the customer mobile station and the computer screen are within a predetermined geographical proximity;
   transferring the transaction amount from the customer account to the merchant account only if the customer mobile station and the computer screen are within the predetermined geographical proximity as a security safeguard to assure that the customer mobile station is actually proximate the computer screen at the time of requesting transfer.

31. The method of claim 30, wherein the computer screen is at a customer predetermined native location.

32. The method of claim 31, wherein the geographic coordinates of the customer mobile station are GPS coordinates.

33. The method of claim 30, wherein the merchant identifier is acquired from a web page displayed on the computer screen.

34. The method of claim 30, wherein the computer screen is at a merchant terminal.

35. The method of claim 30, further comprising obtaining geographic coordinates of the customer mobile station, and comparing the geographic coordinates of the customer mobile station with geographic coordinates of the computer screen to determine whether the customer mobile station and the computer screen are within the predetermined geographical proximity.

36. A method for facilitating automated funds transfer of a transaction amount, the method comprising:
   determining, at a service node of a telecommunications network, whether a customer mobile station and a computer screen displaying a merchant identifier are within a predetermined geographical proximity as a security safeguard to assure that the customer mobile station is actually proximate the computer screen; and
   in response to the determining, arranging, at the service node and in response to a request from the customer mobile station, transfer of a transaction amount from a customer account of a customer financial institution to a merchant account of a merchant financial institution.

37. The method of claim 36, wherein the computer screen is at a customer predetermined native location.

38. The method of claim 37, wherein the merchant identifier is acquired from a web page displayed on the computer screen.

39. The method of claim 36, wherein the computer screen is at a merchant terminal.

40. The method of claim 36, further comprising obtaining geographic coordinates of the customer mobile station, and comparing the geographic coordinates of the customer mobile station with geographic coordinates of the computer screen to determine whether the customer mobile station and the computer screen are within the predetermined geographical proximity.

41. The method of claim 40, wherein the geographic coordinates of the customer mobile station are GPS coordinates.

42. A method for facilitating automated funds transfer of a transaction amount, the method comprising:
- determining, at a service node of a telecommunications network, whether a customer mobile station and a computer screen displaying a merchant identifier are within a predetermined geographical proximity as a security safeguard to assure that the customer mobile station is actually proximate the computer screen; and
- in response to the determining, arranging, at the service node and in response to request from the customer mobile station, for a credit message to be sent to a merchant account of a merchant financial institution and a debit message to be sent to a customer account of a customer financial institution.

43. The method of claim 42, wherein the computer screen is at a customer predetermined native location.

44. The method of claim 43, wherein the merchant identifier is acquired from a web page displayed on the computer screen.

45. The method of claim 42, wherein the computer screen is at a merchant terminal.

46. The method of claim 45, wherein the geographic coordinates of the customer mobile station are GPS coordinates.

47. The method of claim 42, further comprising obtaining geographic coordinates of the customer mobile station, and comparing the geographic coordinates of the customer mobile station with geographic coordinates of the computer screen to determine whether the customer mobile station and the computer screen are within the predetermined geographical proximity.

48. A telecommunications service for facilitating funds transfer of a transaction amount, the service comprising:
- a customer mobile station;
- a computer screen displaying a merchant identifier;
- a customer financial institution;
- a merchant financial institution;
- a service node which, in response to a request from the customer mobile station, arranges for transfer of a transaction amount from a customer account of the customer financial institution to a merchant account of the merchant financial institution provided that the service node determines that the customer mobile station and the computer screen are within a predetermined geographical proximity as a security safeguard to assure that the customer mobile station is actually proximate the computer screen; and
- a mobile switching center connected to the service node and to the customer mobile station; and,
- a data network which connects the service node to the customer financial institution and to the merchant financial institution.

49. The service of claim 48, wherein the computer screen is at a customer predetermined native location.

50. The service of claim 49, wherein the merchant identifier is acquired from a web page displayed on the computer screen.

51. The service of claim 48, wherein the computer screen is at a merchant terminal.

52. The service of claim 48, further comprising obtaining geographic coordinates of the customer mobile station, and comparing the geographic coordinates of the customer mobile station with geographic coordinates of the computer screen to determine whether the customer mobile station and the computer screen are within the predetermined geographical proximity.

53. The service of claim 52, wherein the geographic coordinates of the customer mobile station are GPS coordinates.

54. A service node of a telecommunications network comprising:
- a processor which, in response to a request from a customer mobile station, performs a transfer of a transaction amount from a customer account of a customer financial institution to a merchant account of a merchant financial institution provided that the service node determines as a security safeguard that the customer mobile station and a computer screen displaying a merchant identifier are within a predetermined geographical proximity;
- an interface which connects the processor to the network.

55. The node of claim 54, wherein the computer screen is at a customer predetermined native location.

56. The node of claim 55, wherein the merchant identifier is acquired from a web page displayed on the computer screen.

57. The node of claim 54, wherein the computer screen is at a merchant terminal.

58. The node of claim 54, further comprising obtaining geographic coordinates of the customer mobile station, and comparing the geographic coordinates of the customer mobile station with geographic coordinates of the computer screen to determine whether the customer mobile station and the computer screen are within the predetermined geographical proximity.

59. The node of claim 58, wherein the geographic coordinates of the customer mobile station are GPS coordinates.

60. A telecommunications service for facilitating funds transfer of a transaction amount, the service comprising:
- a customer mobile station;
- a computer screen which displays a merchant identifier;
- a customer financial institution;
- a merchant financial institution;
- a service node which, in response to a call from the customer mobile station:
  (1) acquires the merchant identifier and a transaction amount from the customer mobile station;
  (2) requests transfer of the transaction amount from the customer account to a merchant account of the merchant financial institution;
  (3) determines whether the customer mobile station and the computer screen are within a predetermined geographical proximity prior to requesting transfer of the transaction amount from the customer account to the merchant account of the merchant financial institution as a security safeguard to assure that the customer mobile station is actually proximate the computer screen at the time of requesting transfer; and
- a mobile switching center connected to the service node and to the customer mobile station; and,
- a data network which connects the service node to the customer financial institution and to the merchant financial institution.

61. The service of claim 60, wherein the computer screen is at a customer predetermined native location.

62. The service of claim 61, wherein the merchant identifier is acquired from a web page displayed on the computer screen.

63. The service of claim 60, wherein the computer screen is at a merchant terminal.

64. The service of claim 60, further comprising obtaining geographic coordinates of the customer mobile station, and comparing the geographic coordinates of the customer mobile station with geographic coordinates of the computer screen to determine whether the customer mobile station and the computer screen are within the predetermined geographical proximity.

65. The service of claim 64, wherein the geographic coordinates of the customer mobile station are GPS coordinates.

* * * * *